United States Patent Office 2,924,293
Patented Feb. 9, 1960

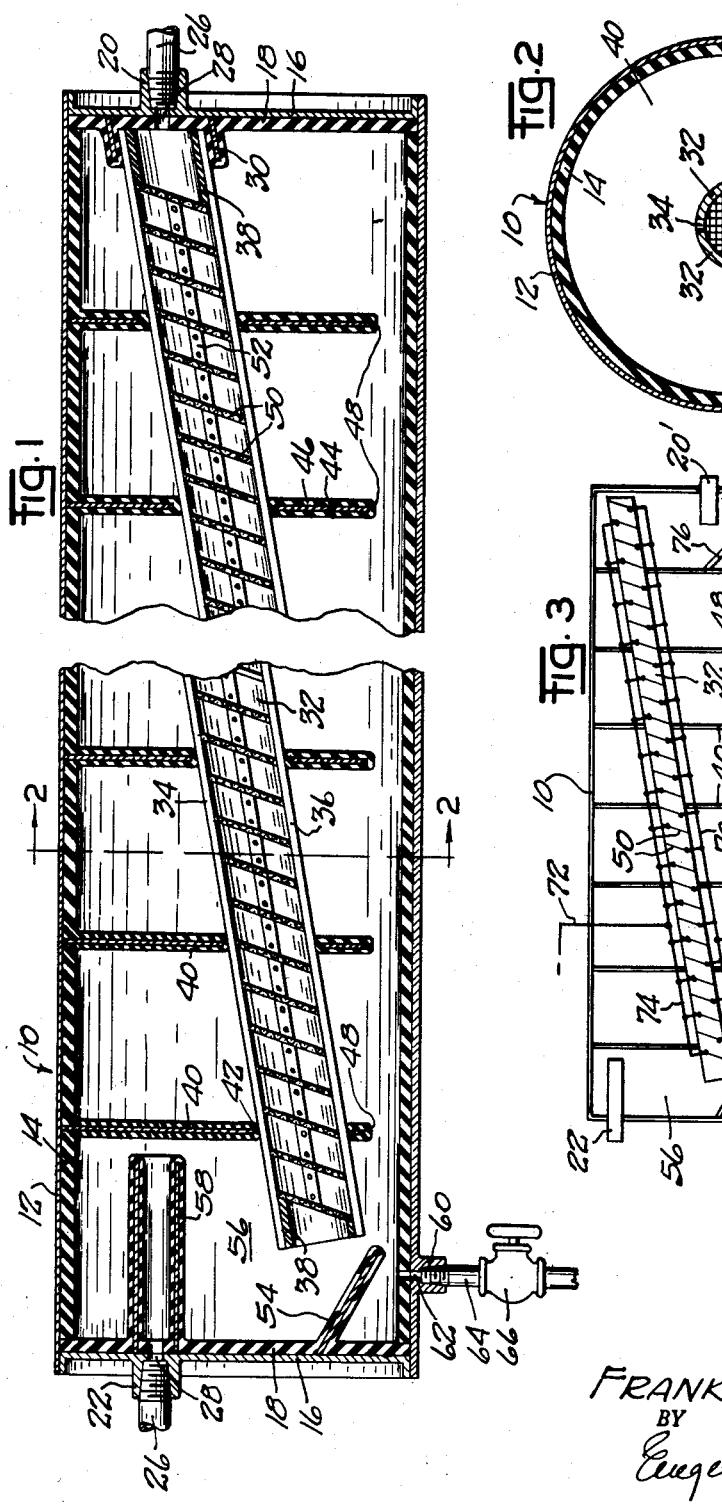
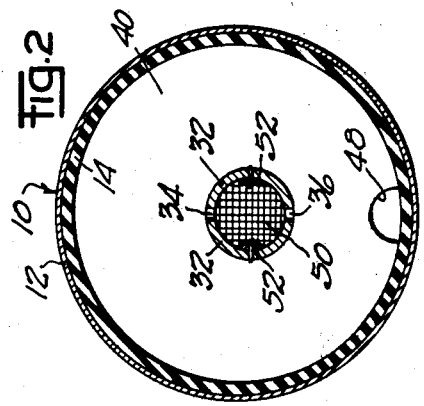
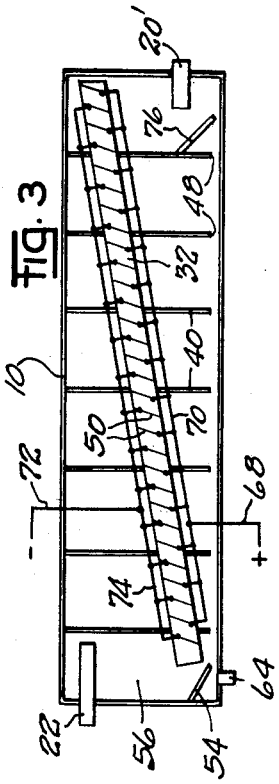

2,924,293

DEVICE FOR REMOVING IMPURITIES FROM GASES

Frank Sprague, Michigan City, Ind.

Application July 5, 1957, Serial No. 670,053

12 Claims. (Cl. 183—7)

This invention relates to a device for removing impurities from gases, and constitutes an improvement upon the device of my Patent No. 2,701,621, dated February 8, 1955.

The primary object of the invention is to provide a device of this character having a novel arrangement to reduce turbulence in flow of gas therethrough, having a high capacity per unit length thereof, and directing a gas stream to reduce entrainment of moisture and impurities into the same after removal thereof from the gas.

A further object is to provide a device of this character having a tubular portion for directing flow of gas therethrough and through reticulated members spanning the same, wherein said tubular member is slotted to permit by-passing of the tube if the reticulated members become clogged and said tubular member is supported by spaced partitions spanning the housing of the device and having restricted openings to limit passage of gas and hence directing rapid return of gas to the tube after by-passing a clogged reticulated member.

A further object is to provide a device of this character having an inclined slotted air passage tube mounting therein a plurality of spaced reticulated members disposed at an angle to the vertical and to the axis of the tube to provide the same of maximum area to augment collection of impurities thereon and to augment flow of the precipitated moisture or impurities collected thereon.

Other objects will be apparent from the following specification.

In the drawing:

Fig. 1 is a longitudinal axial sectional view illustrating one embodiment of the invention;

Fig. 2 is a transverse sectional view taken on line 2—2 of Fig. 1; and

Fig. 3 is a schematic view illustrating a modified embodiment of the invention.

Referring to the drawing, the numeral 10 designates a tubular housing which is preferably formed from a tubular metal member 12 lined with a dielectric material 14, such as porcelain or plastic. End walls are secured to and close the ends of the housing 10 and, as shown, preferably include metal closures 16 having a porcelain or other non-conductive lining 18. The end walls are secured to the housing in any suitable manner and at least one thereof is mounted detachably, as by means of screw threads or the like (not shown). The body housing 10 is preferably of greater length than cross-sectional dimension.

The end walls preferably have tubular sockets 20, 22 extending outwardly therefrom and preferably internally screw-threaded for the connection of fittings 26. The fittings 26 preferably constitute reducers for connection with conduits of comparatively small diameter which constitute parts of a gas-circulating system wherein gas is contained at a pressure above atmosphere. An aperture 28 is formed in each end wall in communication with and preferably centrally relative to adjacent sockets 20 and 22 and is preferably of reduced diameter compared to the bore of the socket.

The end wall which carries the inlet socket 20 mounts a tubular inwardly projecting socket 30 preferably lined or coated with the same dielectric material forming the lining 18 and preferably having its axis inclined, as illustrated in Fig. 1. A tube unit is carried by the socket 30 at one end thereof. This tube unit is of a diameter substantially smaller than the bore of the body 10 and, as here shown, is positioned to extend longitudinally thereof at an inclination to the axis or center line of the body with the end thereof supported by the socket 30 being at a level higher than the opposite end of the tube unit. The opposite ends of the tube unit are preferably spaced from the longitudinal walls of the housing 10.

The tube unit preferably includes a pair of members 32 of arcuate cross-sectional shape arranged in confronting relation to one another with edges spaced to provide an upper longitudinal opening 34 and a lower longitudinal opening 36. Continuous tubular inserts 38 are mounted within the interior of the parts 32 at opposite ends thereof to maintain the desired spacing of the sections 32. Transverse partitions 40 span the housing 10 in spaced relation and have apertures 42 receiving and supporting the tube unit and controlling the spacing of members 32. The partitions 40 are preferably substantially uniformly spaced along the length of the unit and preferably constitute metal plates 44 covered with dielectric material 46. The tube forming sections 32 will preferably be formed of a dielectric material, although it will be understood that in non-electrical constructions the tube sections may be formed of metal or other conductive material. The partitions 40 preferably extend from the top of the substantially horizontally elongated housing 10 but are cut away at 48 adjacent to the lowermost part of the bottom section of the unit to provide intercommunication between the various compartments separated by the partitions 40.

The tube unit mounts a plurality of reticulated or screen members 50 in substantially uniformly spaced relation therealong. The screen members are preferably metallic and are arranged in substantially parallel relation and at an angle to the vertical and to the perpendicular with respect to the axis of the tube unit. The spacing and positioning of the screen members is determined by spacer members 52 positioned within the tube member. The shape and character of the spacers 52 may vary as desired.

The lowermost end of the tube unit is open and terminates spaced from the adjacent end wall 16. A baffle 54 inclined downwardly and inwardly from the end wall may confront the lower end of the tube and serves to deflect a gas stream discharged from the lower end of the tube in an upward direction within the compartment 50 defined between the end wall mounting the socket 22 and the adjacent partition 40. Within this outlet chamber 56 projects a tube 58 communicating with the opening 28 and preferably lined with the same dielectric material constituting the lining 18 of the adjacent end wall. The tube 58 is open within chamber 56 and preferably extends adjacent to the partition 40 so that it partially overlies the lower end of tube unit 32.

A socket 60 is formed in the bottom of the casing 10, preferably adjacent to the lower discharge end of the conduit or tube unit 32 and preferably below the deflecting plate 54. The socket 60 communicates with outlet opening 62 in housing 10 and with outlet conduit 64 which has interposed therein a valve 66 which is normally closed gas-tight.

In the preferred form of the invention, the reticulated members 50 constitute electrodes, and alternate electrodes are charged to opposite polarity, as illustrated in Fig. 3. Thus an electrical conductor 68 of one polarity has branching therefrom conductors 70 which are electrically connected to alternate reticulated members 50, and a conductor 72 of opposite polarity is connected to the intervening reticulated members 50 by conductors 74. The conductors 68 and 70 will be connected in an electrical circuit, preferably of low voltage, such as a direct current circuit powered by a battery and of a voltage in the range of approximately six volts to twelve volts.

In one embodiment of the invention, the housing 10 is positioned substantially horizontally and is preferably approximately six inches in diameter, and the tube unit 32 is preferably approximately three inches in diameter. The reticulated members 50 are positioned in this tube unit spaced approximately three-quarters of an inch and at an angle of from zero to forty-five degrees relative to vertical position, with an angle of fifteen to twenty degrees to the vertical being preferred.

Fig. 3 also illustrates schematically an arrangement somewhat different from that shown in Fig. 1, in that the inlet socket 20' is located at a position below the level of the upper end of the tube unit 32, and the upper end of the tube unit 32 terminates short of the end wall which mounts the inlet socket 20' and is in free and open communication with the interior of the housing 10 adjacent to that end wall. An inclined baffle 76 is preferably mounted in the housing in the compartment in which the inlet socket 20' discharges for the purpose of deflecting upwardly toward the upper inlet end of the tube the gas stream which enters at the inlet 20'.

The opening 48 at the bottom of each partition 40 is preferably of a size less than the cross-sectional area of the tube unit 32 so as to limit the communication between the parts of the housing and to insure that resistance to flow of gas through the tube 32 is less than resistance to flow of gas through the openings 48. Consequently, gas flowing in the system, preferably behind an after-cooler (not shown) which serves to remove excessive moisture from gas in compressed gas systems, tends to flow through the inlet, thence lengthwise through the tube unit 32 for discharge at the compartment 56 and passage through the same and into and through the tube 58 and the outlet socket 22. However, if any of the reticulated members 50 become clogged, the gas can by-pass the same by discharge through the slots 34 and 36 ahead of the clogged reticulated member. The gas so by-passed will normally reenter the tube behind the clogged reticulated member because of the lesser resistance to gas flow through the tube than occurs through the reticulated passage 48 in adjacent partitions 40. However, if the clogging at one section of the tube is excessive, the openings 48 do permit by-passage of the gas around the clogged section for reentry into the tube at a subsequent compartment at which the reticulated members of the tube are not so clogged and hence provide a lesser resistance to air flow than is provided by the restricted lower partition openings 48.

The inclination of the reticulated members to the axis of the tube and to the axis of the housing provides each of substantial area, that is, an area greater than the cross-sectional diameter of the tube, and hence increases the effectiveness of the entrainment thereon of particles of foreign matter contained within the gas stream. The inclination of these reticulated members 50 also augments the down flow thereon of precipitated droplets of moisture and impurities which have been collected thereon.

The baffle 54 and, where used, the baffle 76 serve to reduce turbulence and to direct the air stream. The reduction of turbulence by the baffle 54 is particularly important because turbulence at the discharge end of the tube 32 might entail the reentrainment of moisture and impurities in the gas stream after the stream has been freed therefrom by its travel through the reticulated members 50. The baffle member 76, where used, deflects the gas stream to insure against any substantial passage of gas entering the inlet 20 passing directly through the opening 48 in the air toward the inlet end of the tube unit. At the same time an up-flow is provided in each case, that is, by each of the baffles 54 and 76, and will assist in the precipitation of condensate within the gas stream.

In cases where the reticulated members are not electrically charged, the device may be required to be of larger size and particularly greater length, using more reticulated members than is required in cases where the electrodes are charged. Where the electrodes are charged there is a tendency for any charge of the entrained particles to be altered by the potential of the electrodes. Also, a zone of turbulence is created around each electrode and between adjacent electrodes. These two factors tend to increase or enhance the likelihood that the entrained particles come into contact with the reticulated members and be deposited thereon by the gas stream.

In each embodiment of the invention, the gas flows in the path of lowest resistance, i.e., normally from the inlet to and through the inclined tube and thence to the outlet. The gas passes through the reticulated members upon which entrained particles are deposited. The moisture deposited tends to form droplets which flow down the screen, and pick up solid particles. The droplets fall from the screen through the tube opening 36 and onto the lowermost part of the housing for flow to and collection at the outlet 64.

While the preferred embodiment of the invention has been illustrated and described, it will be understood that changes in the construction may be made within the scope of the appended claims without departing from the spirit of the invention.

I claim:

1. A device for removing impurities from gases, comprising a substantially horizontal elongated housing having an inlet for gases to be cleaned at one end and an outlet for cleaned gases at its opposite end, a plurality of spaced transverse partitions spanning said housing and each having an opening therethrough intermediate its height and an opening at the lowermost part thereof, an inclined tubular member supported in said intermediate partition openings and having a longitudinal opening therein at its lowermost part, a plurality of reticulated members spanning said tubular member in spaced relation and inclined relative to the axis of said tubular member, and a normally closed impurity outlet in the lowermost part of said housing, said lowermost partition opening being smaller than the cross-section of said tube.

2. A device as defined in claim 1, wherein the lowermost end of said tube unit is positioned below the level of said gas outlet and an inclined baffle deflects upwardly gases discharged from said lower tube end.

3. A device as defined in claim 1, wherein the gas inlet is positioned below the level of the upper end of said tube unit and an inclined baffle deflects upwardly toward said upper tube end the gases entering said gas inlet.

4. A device as defined in claim 1, wherein said reticulated members constitute electrodes charged to opposite polarity.

5. A device as defined in claim 1, wherein the interior of said housing and said partitions are coated with dielectric material.

6. A device as defined in claim 1, wherein said reticulated members are inclined to the vertical at an angle not more than 45 degrees.

7. A device as defined in claim 1, wherein said reticulated members are inclined to the vertical at an angle between 15 degrees and 20 degrees.

8. A device as defined in claim 1, wherein said tubular member constitutes a pair of parallel members of arcuate cross-sectional shape held in spaced relation by a plurality of spaced tubular inserts mounted therein.

9. A device for removing impurities from gases, comprising a substantially horizontal elongated housing having an inlet at one end for gases to be cleaned and an outlet at its opposite end for cleaned gases, a plurality of transverse partitions spanning said housing and spaced from each other and from the ends of the housing, each partition having an opening therethrough intermediate its height and a smaller opening at the lowermost part thereof, an inclined tubular member supported in said intermediate partition openings and having a longitudinal opening therein at its lowermost part, the lowermost end of said tubular member terminating spaced below said gas outlet and between and spaced from the outlet end wall and the adjacent partition, a plurality of reticulated members spanning said tubular member in spaced relation and inclined relative to the axis of said tubular member, and a normally closed impurity outlet at the lowermost part of said housing.

10. A device for removing impurities from gases, comprising a substantially horizontal elongated housing having an inlet at one end for gases to be cleaned and an outlet at its opposite end for cleaned gases, a plurality of transverse partitions spanning said housing and spaced from each other and from the ends of the housing, each partition having an opening therethrough intermediate its height and a smaller opening at the lowermost part thereof, an inclined tubular member supported in said intermediate partition openings and having a longitudinal opening therein at its lowermost part, the lowermost end of said tubular member terminating spaced below said gas outlet and between and spaced from the outlet end wall and the adjacent partition, and the uppermost end of said tubular member terminating spaced above said gas inlet and between and spaced from the inlet end wall and the adjacent partition, a plurality of reticulated members spanning said tubular member in spaced relation and inclined relative to the axis of said tubular member, and a normally closed impurity outlet at the lowermost part of said housing.

11. A device for removing impurities from gases, comprising a substantially horizontal elongated housing having an inlet at one end for gases to be cleaned and an outlet at its opposite end for cleaned gases, a plurality of transverse partitions spanning said housing and spaced from each other and from the ends of the housing, each partition having an opening therethrough intermediate its height and a smaller opening at the lowermost part thereof, an inclined tubular member supported in said intermediate partition openings and having a longitudinal opening therein at its lowermost part, the lowermost end of said tubular member terminating spaced below said gas outlet and between and spaced from the outlet end wall and the adjacent partition, a plurality of reticulated members spanning said tubular member in spaced relation and inclined relative to the axis of said tubular member, and a normally closed impurity outlet at the lowermost part of said housing, said reticulated members being positioned substantially parallel to each other in planes positioned between vertical and 45 degrees displaced from vertical.

12. A device for removing impurities from gases, comprising a substantially horizontal elongated housing having an inlet at one end for gases to be cleaned and an outlet at its opposite end for cleaned gases, a plurality of transverse partitions spanning said housing and spaced from each other and from the ends of the housing, each partition having an opening therethrough intermediate its height and a smaller opening at the lowermost part thereof, an inclined tubular member supported in said intermediate partition openings and having a longitudinal opening therein at its lowermost part, the lowermost end of said tubular member terminating spaced below said gas outlet and between and spaced from the outlet end wall and the adjacent partition, a plurality of reticulated members spanning said tubular member in spaced relation and inclined relative to the axis of said tubular member, and a normally closed impurity outlet at the lowermost part of said housing, said reticulated members being spaced apart substantially uniformly and less than the spacing between said partitions.

References Cited in the file of this patent
UNITED STATES PATENTS 2,701,621  Sprague _____ Feb. 8, 1955